US012603234B2

(12) United States Patent
Wang et al.

(10) Patent No.: US 12,603,234 B2
(45) Date of Patent: Apr. 14, 2026

(54) CORE, HIGH-VOLTAGE MULTILAYER SOLID ALUMINUM ELECTROLYTIC CAPACITOR AND METHOD FOR PREPARING SAME

(71) Applicant: FUJIAN GUOGUANG XINYE SCI-TEC CO., LTD., Fuzhou (CN)

(72) Inventors: Guoping Wang, Fuzhou (CN); Changsai Lai, Fuzhou (CN); Qiushui Zhang, Fuzhou (CN); Caihao Rao, Fuzhou (CN); Lifeng Zhang, Fuzhou (CN)

(73) Assignee: FUJIAN GUOGUANG XINYE SCI-TEC CO., LTD., Fuzhou (CN)

( * ) Notice: Subject to any disclaimer, the term of this patent is extended or adjusted under 35 U.S.C. 154(b) by 178 days.

(21) Appl. No.: 18/752,278

(22) Filed: Jun. 24, 2024

(65) Prior Publication Data

US 2024/0347281 A1       Oct. 17, 2024

(30) Foreign Application Priority Data

Jul. 18, 2023    (CN) .......................... 202310879895.X

(51) Int. Cl.
| | |
|---|---|
| *H01G 9/15* | (2006.01) |
| *H01G 9/00* | (2006.01) |
| *H01G 9/012* | (2006.01) |
| *H01G 9/04* | (2006.01) |
| *H01G 9/045* | (2006.01) |
| *H01G 9/07* | (2006.01) |

(52) U.S. Cl.
CPC ............. *H01G 9/15* (2013.01); *H01G 9/0036* (2013.01); *H01G 9/012* (2013.01); *H01G 9/045* (2013.01); *H01G 9/07* (2013.01)

(58) Field of Classification Search
None
See application file for complete search history.

(56) References Cited

U.S. PATENT DOCUMENTS

| | | | |
|---|---|---|---|
| 6,920,035 B2 * | 7/2005 | Nagasawa | .............. H01G 11/56 |
| | | | 29/25.03 |
| 7,215,534 B2 * | 5/2007 | Saito | .................... H01G 9/0425 |
| | | | 361/532 |

(Continued)

FOREIGN PATENT DOCUMENTS

| | | | | |
|---|---|---|---|---|
| CN | 101529541 A | * | 9/2009 | ............. H01G 9/012 |
| CN | 105405661 A | * | 3/2016 | ............. H01G 13/02 |

(Continued)

*Primary Examiner* — Dion R. Ferguson

(57) ABSTRACT

A core includes an aluminum foil, a first insulating plate and a second insulating plate. The first insulating plate and the second insulating plate are insulatedly bonded to opposite two sides of the aluminum foil, respectively. A middle of each of the first insulating plate and the second insulating plate is provided with a rectangular hollow portion. A surface of the hollow portion is sequentially provided with a conductive polymer layer, a conductive carbon paste layer and a conductive silver paste layer from inside to outside. A multilayer solid aluminum electrolytic capacitor, including N cores, a conductive frame, a rivet, a substrate and a resin casing, is also provided. This application also provides a method for preparing the multilayer solid aluminum electrolytic capacitor.

10 Claims, 13 Drawing Sheets

(56) References Cited

U.S. PATENT DOCUMENTS

| | | | | |
|---|---|---|---|---|
| 7,277,271 B2 * | 10/2007 | Yamaguchi | .............. | H01G 9/08 |
| | | | | 29/25.03 |
| 7,355,835 B2 * | 4/2008 | Saitou | ...................... | H01G 9/26 |
| | | | | 361/321.1 |
| 7,550,360 B2 * | 6/2009 | Yoshida | ................... | H01G 9/15 |
| | | | | 29/25.03 |
| 10,090,111 B2 * | 10/2018 | Liu | ......................... | H01G 9/15 |
| 11,211,204 B2 * | 12/2021 | Yokokura | .............. | H01G 9/012 |
| 11,244,790 B2 * | 2/2022 | Horio | ....................... | H01G 9/08 |
| 2005/0047060 A1 * | 3/2005 | Arai | ......................... | H01G 9/15 |
| | | | | 361/312 |
| 2006/0018084 A1 * | 1/2006 | Saito | ...................... | H01G 9/012 |
| | | | | 361/523 |
| 2006/0262490 A1 * | 11/2006 | Saitou | ...................... | H01G 9/15 |
| | | | | 361/540 |
| 2007/0019366 A1 * | 1/2007 | Yamaguchi | .............. | H01G 9/08 |
| | | | | 361/540 |
| 2007/0159771 A1 * | 7/2007 | Saito | ...................... | H01G 9/012 |
| | | | | 361/528 |
| 2007/0297121 A1 * | 12/2007 | Yoshida | ................... | H01G 9/15 |
| | | | | 361/523 |
| 2009/0073639 A1 * | 3/2009 | Ishizuka | ............... | H01G 9/025 |
| | | | | 361/523 |
| 2019/0006114 A1 * | 1/2019 | Okamoto | .............. | H01G 9/025 |
| 2020/0303130 A1 * | 9/2020 | Furukawa | .............. | H01G 9/048 |
| 2023/0105450 A1 * | 4/2023 | Ohbayashi | ................. | C09J 9/02 |
| | | | | 361/500 |
| 2024/0347281 A1 * | 10/2024 | Wang | ...................... | H01G 9/15 |

FOREIGN PATENT DOCUMENTS

| | | | | | |
|---|---|---|---|---|---|
| JP | 4796975 B2 | * | 10/2011 | | |
| KR | 100907600 B1 | * | 7/2009 | .............. | H01G 9/14 |
| KR | 20210054378 A | * | 5/2021 | ............ | H01G 9/048 |
| KR | 2021134550 A | * | 11/2021 | | |
| WO | WO-2024009824 A1 | * | 1/2024 | ............ | H01G 9/055 |
| WO | WO-2024070508 A1 | * | 4/2024 | ............ | H01G 9/042 |

* cited by examiner

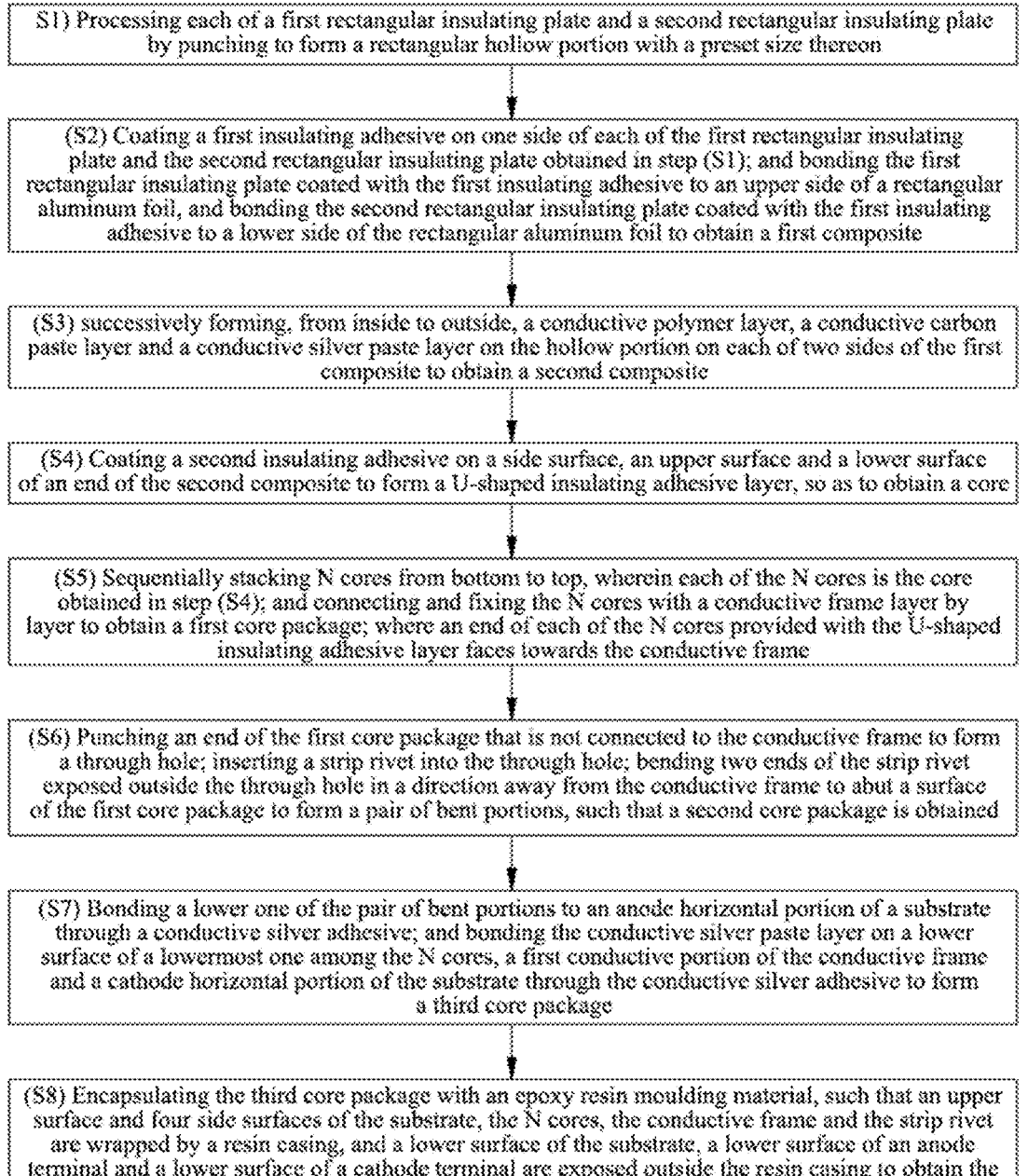

S1) Processing each of a first rectangular insulating plate and a second rectangular insulating plate by punching to form a rectangular hollow portion with a preset size thereon (S2) Coating a first insulating adhesive on one side of each of the first rectangular insulating plate and the second rectangular insulating plate obtained in step (S1); and bonding the first rectangular insulating plate coated with the first insulating adhesive to an upper side of a rectangular aluminum foil, and bonding the second rectangular insulating plate coated with the first insulating adhesive to a lower side of the rectangular aluminum foil to obtain a first composite (S3) successively forming, from inside to outside, a conductive polymer layer, a conductive carbon paste layer and a conductive silver paste layer on the hollow portion on each of two sides of the first composite to obtain a second composite (S4) Coating a second insulating adhesive on a side surface, an upper surface and a lower surface of an end of the second composite to form a U-shaped insulating adhesive layer, so as to obtain a core (S5) Sequentially stacking N cores from bottom to top, wherein each of the N cores is the core obtained in step (S4); and connecting and fixing the N cores with a conductive frame layer by layer to obtain a first core package; where an end of each of the N cores provided with the U-shaped insulating adhesive layer faces towards the conductive frame (S6) Punching an end of the first core package that is not connected to the conductive frame to form a through hole; inserting a strip rivet into the through hole; bending two ends of the strip rivet exposed outside the through hole in a direction away from the conductive frame to abut a surface of the first core package to form a pair of bent portions, such that a second core package is obtained (S7) Bonding a lower one of the pair of bent portions to an anode horizontal portion of a substrate through a conductive silver adhesive; and bonding the conductive silver paste layer on a lower surface of a lowermost one among the N cores, a first conductive portion of the conductive frame and a cathode horizontal portion of the substrate through the conductive silver adhesive to form a third core package (S8) Encapsulating the third core package with an epoxy resin moulding material, such that an upper surface and four side surfaces of the substrate, the N cores, the conductive frame and the strip rivet are wrapped by a resin casing, and a lower surface of the substrate, a lower surface of an anode terminal and a lower surface of a cathode terminal are exposed outside the resin casing to obtain the multilayer solid aluminum electrolytic capacitor

Fig. 11

CORE, HIGH-VOLTAGE MULTILAYER SOLID ALUMINUM ELECTROLYTIC CAPACITOR AND METHOD FOR PREPARING SAME

CROSS-REFERENCE TO RELATED APPLICATIONS

This application claims the benefit of priority from Chinese Patent Application No. 202310879895.X, filed on Jul. 18, 2023. The content of the aforementioned application, including any intervening amendments thereto, is incorporated herein by reference in its entirety.

TECHNICAL FIELD

This application relates to solid aluminum electrolytic capacitors, and more specifically to a core, a high-voltage multilayer solid aluminum electrolytic capacitor and a method for preparing the same.

BACKGROUND

Solid aluminum electrolytic capacitors include winding-type solid aluminum electrolytic capacitors and multilayer solid aluminum electrolytic capacitors, both of which use conductive polymers as the solid electrolyte. Nevertheless, in the multilayer solid aluminum electrolytic capacitor, multilayer cores are stacked in parallel, and surface mounting technology (SMT) is adopted, enabling it to better match the development demands for miniaturization and light weight of the whole machine in the electronic information industry compared with winding-type solid aluminum electrolytic capacitor.

A mature industrialized process for preparing the multilayer solid aluminum electrolytic capacitor mainly includes the following steps. A cut formed foil is divided into an anode zone and a cathode zone with a barrier adhesive. The dielectric layer at a side of the cathode zone is subjected to formation for repair. After that, a conductive polymer solid electrolyte layer, a conductive carbon paste layer and a conductive silver paste layer are successively formed on the surface of the cathode zone such that a core of the capacitor is obtained. The anodes of multiple cores are stacked and welded on an external lead frame, and the cathodes of the multiple cores are stacked and pasted on the external lead frame, such that a core package of the capacitor is formed. The core package is subjected to encapsulation with resin, aging, and lead formation to obtain the solid aluminum electrolytic capacitor.

In the above process, during the preparation of the capacitor core, the dielectric layer on the side of the foil needs to be reformed for repairing. Unfortunately, the existing reformation process shows a poor repairing effect on the dielectric layer (alumina film layer) of the aluminum foil with a higher formation voltage. The alumina film layer reformed on the surface of the metal aluminum core that is exposed due to the cutting at the edge of the cathode zone is difficult to be consistent with the alumina film layer of the original aluminum foil with respect to thickness, denseness and homogeneity, which greatly affects the voltage resistance of the capacitor. At the same time, for the aluminum foil with a higher formation voltage, its alumina film layer has a high brittleness. Therefore, cutting the original alumina film located at the edge of aluminum foil is prone to produce deep cracks, which may lead to a local short-circuit after covering the conductive polymer cathode material, thereby increasing the leakage current of the product and the risk of product failure at application terminals.

SUMMARY

An objective of the present disclosure is to provide a core, a high-voltage-resistant multilayer solid aluminum electrolytic capacitor and a method for preparing the same to overcome the problem of poor voltage-resistant performance of the product in the prior art due to poor repair performance of the dielectric layer on the cutting side of the aluminum foil at a higher formation voltage.

Technical solutions of the present disclosure are described below.

In a first aspect, this application provides a core, comprising:

an aluminum foil;

a first insulating plate; and a second insulating plate;

wherein the aluminum foil, the first insulating plate and the second insulating plate are all rectangular; the first insulating plate is insulatedly bonded to a first side of the aluminum foil, and the second insulating plate is insulatedly bonded to a second side of the aluminum foil, wherein the first side of the aluminum foil is opposite to the second side of the aluminum foil; a middle of each of the first insulating plate and the second insulating plate is provided with a rectangular hollow portion; and an area of a surface of each of the first side of the aluminum foil and the second side of the aluminum foil corresponding to the rectangular hollow portion is provided with a conductive polymer layer, a conductive carbon paste layer and a conductive silver paste layer in sequence from inside to outside.

In some embodiments, a first end of the core is provided with a through hole, and a second end of the core is provided with a U-shaped insulating adhesive layer, wherein the first end of the core is opposite to the second end of the core; the through hole is configured to successively run through the first insulating plate, the aluminum foil and the second insulating plate; and the U-shaped insulating adhesive layer comprises a first part, a second part and a third part, wherein the first part of the U-shaped insulating adhesive layer is provided on a side of the first insulating plate away from the second insulating plate; the third part of the U-shaped insulating adhesive layer is provided on a side of the second insulating plate away from the first insulating plate; and the second part is configured to adjoin ends of the aluminum foil, the first insulating plate and the second insulating plate.

In some embodiments, a length of each of the first insulating plate and the second insulating plate is 100-120% of a length of the aluminum foil; and a width of each of the first insulating plate and the second insulating plate is 100-120% of a width of the aluminum foil.

In some embodiments, a length of the hollow portion is 50-80% of a length of each of the first insulating plate and the second insulating plate; and a width of the hollow portion is 70-90% of a width of each of the first insulating plate and the second insulating plate.

In a second aspect, this application provides a high-voltage-resistant multilayer solid aluminum electrolytic capacitor, comprising:

the aforementioned core;

a conductive frame;

a rivet;

a substrate; and a resin casing;

wherein the number of the core is N, and the N cores are configured to be sequentially stacked from bottom to top; adjacent conductive silver paste layers of adjacent two cores among the N cores are electrically connected; insulating plates of the adjacent two cores that are close to each other are insulatedly connected; ends of the N cores provided with the U-shaped insulating adhesive layer are connected through the conductive frame, and the conductive frame is in contact with and electrically connected to a conductive silver paste layer of each of the N cores; the rivet is configured to sequentially pass through through holes of the N cores; and a first end of the rivet is configured to extend out of an uppermost core among the N cores, and a second end of the rivet is configured to extend out of a lowermost core among the N cores;

the substrate is rectangular; a first end of the substrate is provided with an anode leading-out terminal, and a second end of the substrate is provided with a cathode leading-out terminal, wherein the first end of the substrate is opposite to the second end of the substrate; the N cores are provided on a surface of the substrate; the second end of the rivet is in contact with and electrically connected to the anode leading-out terminal; and the conductive frame is in contact with and electrically connected to the cathode leading-out terminal; and the resin casing is configured to cover an upper surface and four side surfaces of the substrate, the N cores, the conductive frame, and the rivet; and lower surfaces of the substrate, the anode leading-out terminal and the cathode leading-out terminal are exposed outside the resin casing.

In some embodiments, the first end of the rivet is configured to be bent in a direction away from the conductive frame to form a first bent portion, and the second end of the rivet is configured to be bent in a direction away from the conductive frame to form a second bent portion; and the second bent portion is in contact with the substrate.

In some embodiments, the conductive frame comprises a first conductive portion and 2N−1 second conductive portions; the first conductive portion is horizontally arranged; the 2N−1 second conductive portions each have an L-shaped structure, and are vertically arranged; and the 2N−1 second conductive portions are arranged at equal intervals;

a midmost one among the 2N−1 second conductive portions is denoted as a No. 1 L-shaped second conductive portion; remaining second conductive portions among the 2N−1 second conductive portions are symmetrically arranged with respect to the No. 1 second conductive portion; and N−1 second conductive portions among the 2N−1 second conductive portions at a first side of the No. 1 second conductive portion are sequentially denoted as a No. 2 second conductive portion, a No. 4 second conductive portion, a No. 6 second conductive portion, . . . , and a No. (2N−2) second conductive portion along a direction away from the No. 1 second conductive portion; and N−1 second conductive portions among the 2N−1 second conductive portions at a second side of the No. 1 second conductive portion are sequentially denoted as a No. 3 second conductive portion, a No. 5 second conductive portion, a No. 7 second conductive portion, a No. 9 second conductive portion, . . . , and a No. (2N−1) second conductive portion along a direction away from the No. 1 second conductive portion; and the first conductive portion is provided on the conductive silver paste layer on a lower surface of the lowermost one among the N cores; a horizontal portion of the No. 1 second conductive portion is provided on the conductive silver paste layer on an upper surface of the lowermost one among the N cores; horizontal portions of the No. 2 second conductive portion and the No. 3 second conductive portion are provided on the conductive silver paste layer on an upper surface of a second lowermost one among the N cores; horizontal portions of a the No. 4 second conductive portion and the No. 5 second conductive portion are provided on the conductive silver paste layer on an upper surface of a third lowermost one among the N cores, . . . , and horizontal portions of the No. (2N−2) second conductive portion and the No. (2N−1) second conductive portion are provided on the conductive silver paste layer on an upper surface of a $N^{th}$ lowermost one among the N cores.

In some embodiments, the anode leading-out terminal comprises an anode horizontal portion, an anode connection portion and an anode terminal; the anode horizontal portion is provided on the upper surface of the substrate, and the anode terminal is provided on a lower surface of the substrate; the anode horizontal portion is in contact with and electrically connected with the rivet; and the anode connection portion is configured to penetrate the substrate, and is perpendicularly and electrically connected with the anode horizontal portion and the anode terminal; and the cathode leading-out terminal is identical to the anode leading-out terminal in structure and shape.

In a third aspect, this application provides a method for preparing a high-voltage-resistant multilayer solid aluminum electrolytic capacitor, comprising:

(S1) processing each of a first rectangular insulating plate and a second rectangular insulating plate by punching to form a rectangular hollow portion with a preset size thereon;

(S2) coating a first insulating adhesive on one side of each of the first rectangular insulating plate and the second rectangular insulating plate obtained in step (S1); and bonding the first rectangular insulating plate coated with the first insulating adhesive to an upper side of a rectangular aluminum foil, and bonding the second rectangular insulating plate coated with the first insulating adhesive to a lower side of the rectangular aluminum foil to obtain a first composite;

(S3) successively forming, from inside to outside, a conductive polymer layer, a conductive carbon paste layer and a conductive silver paste layer on the hollow portion on each of two sides of the first composite to obtain a second composite;

(S4) coating a second insulating adhesive on a side surface, an upper surface and a lower surface of an end of the second composite to form a U-shaped insulating adhesive layer, so as to obtain a core;

(S5) sequentially stacking N cores from bottom to top, wherein each of the N cores is the core obtained in step (S4); and connecting and fixing the N cores with a conductive frame layer by layer to obtain a first core package; wherein an end of each of the N cores provided with the U-shaped insulating adhesive layer faces towards the conductive frame;

(S6) punching an end of the first core package that is not connected to the conductive frame to form a through hole; inserting a strip rivet into the through hole; bending two ends of the strip rivet exposed outside the through hole in a direction away from the conductive frame to abut a surface of the first core package to form a pair of bent portions, such that a second core package is obtained;

(S7) bonding a lower one of the pair of bent portions to an anode horizontal portion of a substrate through a conductive silver adhesive; and bonding the conductive silver paste layer on a lower surface of a lowermost one among the N cores, a first conductive portion of the conductive frame and a cathode horizontal portion of the substrate through the conductive silver adhesive to form a third core package; and (S8) encapsulating the third core package with an epoxy resin moulding material, such that an upper surface and four side surfaces of the substrate, the N cores, the conductive frame and the strip rivet are wrapped by a resin casing, and a lower surface of the substrate, a lower surface of an anode terminal and a lower surface of a cathode terminal are exposed outside the resin casing to obtain the multilayer solid aluminum electrolytic capacitor.

In some embodiments, step (S5) further comprises the following steps:

(S51) coating the conductive silver adhesive on a surface of the first conductive portion of the conductive frame toward a plurality of second conductive portions of the conductive frame; bonding the conductive silver paste layer on a lower surface of a first core among the N cores to the first conductive portion; and attaching a midmost one among the plurality of second conductive portions to an end side of the first core, and bending the midmost one among the plurality of second conductive portions toward an upper surface of the first core at an angle of 90° to form a first horizontal portion to be in contact with the conductive silver paste layer on the upper surface of the first core to complete stacking of the first core;

(S52) coating a third insulating adhesive on a surface of the first rectangular insulating plate of the first core; coating the conductive silver adhesive on a surface of the conductive silver paste layer on the upper surface of the first core and a surface of the horizontal portion of the midmost one among the plurality of second conductive portions; bonding the second insulating plate of a second core among the N cores to the first insulating plate of the first core; bonding the conductive silver paste layer on a lower surface of the second core with the conductive silver paste layer on the upper surface of the first core and the horizontal portion of the midmost one among the plurality of second conductive portions; attaching two second conductive portions among the plurality of second conductive portions adjacent to the midmost one to an end side of the second core, and bending the two second conductive portions adjacent to the midmost one among the plurality of second conductive portions toward an upper surface of the second core at an angle of 90° to form a second horizontal portion to be in contact with the conductive silver paste layer on the upper surface of the second core to complete stacking of the second core; and (S53) repeating step (S52) to sequentially complete stacking of $3^{rd}$-$N^{th}$ cores among the N cores to obtain the first core package.

The beneficial effects of the present disclosure are described below.

In the present disclosure, an insulating film material with hollow portions is used to mask the periphery of the formed aluminum foil, and a cathode layer is formed on the area exposed in the center of the aluminum foil. In this case, the cathode layers on both sides of the aluminum foil are not connected, thereby realizing the division of cathode and anode. In addition, the present disclosure solves the problem of poor voltage resistance, which is caused by the inconsistency between the alumina film layer of the aluminum foil whose sides are reformed and the alumina film layer of the original aluminum foil with respect to thickness, denseness and homogeneity. Moreover, the present disclosure also solves the problems of local short-circuit, large leakage current and high risks of product failure at application terminals caused by the coverage of the conductive polymer cathode material on the deep cracks, where the deep cracks are produced by cutting the alumina film layer on the original aluminum foil. Therefore, the core provided in the present disclosure can be used in the high-voltage-resistant multilayer solid aluminum electrolytic capacitor to significantly increase the voltage-resistant performance of the capacitor, and lower the risks on application terminals.

BRIEF DESCRIPTION OF THE DRAWINGS

To illustrate the technical solutions of the embodiments of the present disclosure more clearly, the accompanying drawings needed in the description of the embodiments will be introduced briefly below. Obviously, the following accompanying drawings are only some of the embodiments of the present disclosure, and other accompanying drawings can be obtained by one of ordinary skill int the art based on these drawings without making creative effort.

FIG. 11 is a flow chart of the method for preparing the solid aluminum electrolytic capacitor according to an embodiment of the present disclosure;

Figure 1:
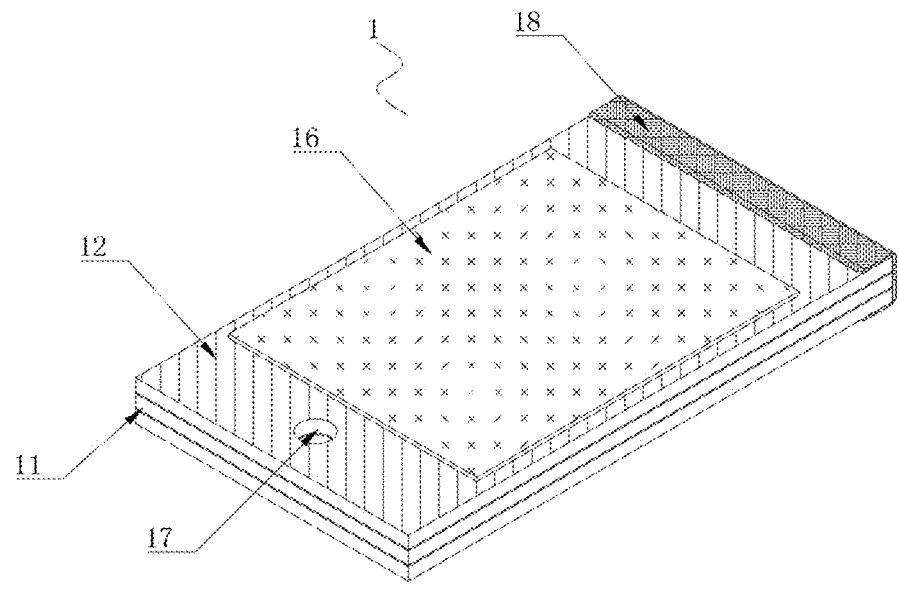
FIG. 1 is a structural diagram of a core according to an embodiment of the present disclosure.

IN THE DRAWINGS 1, core; 11, aluminum foil; 12, insulating plate; 13, hollow portion; 14, conductive polymer layer; 15, conductive carbon paste layer; 16, conductive silver paste layer; 17, through hole; 18, U-shaped insulating adhesive layer; 2, conductive frame; 21, first conductive portion; 22, L-shaped second conductive portion; 3, rivet; 31, bent portion; 4, substrate; 5, resin casing; 6, anode leading-out terminal; 61, anode horizontal portion; 62, anode connection portion; 63, anode terminal; and 7, cathode leading-out terminal.

DETAILED DESCRIPTION OF EMBODIMENTS

The technical solutions in the embodiments of the present disclosure will be described clearly and completely with reference to the accompanying drawings. Obviously, the described embodiments are only a part of the embodiments of the present disclosure. Based on the embodiments in the present disclosure, all other embodiments obtained by one of ordinary skill in the art without making creative labor shall fall within the scope of protection of the present disclosure.

Embodiment 1

Figure 2:
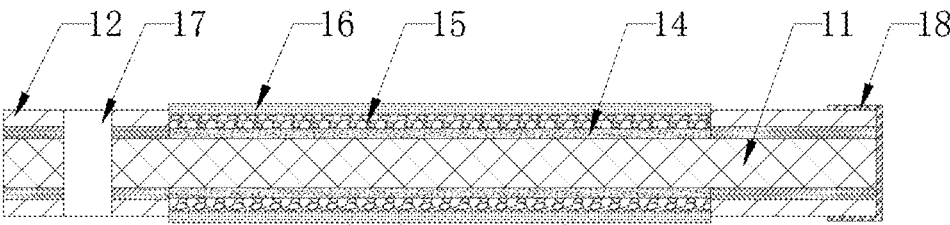
FIG. 2 is a cross-sectional view of the core according to an embodiment of the present disclosure.
Figure 3:
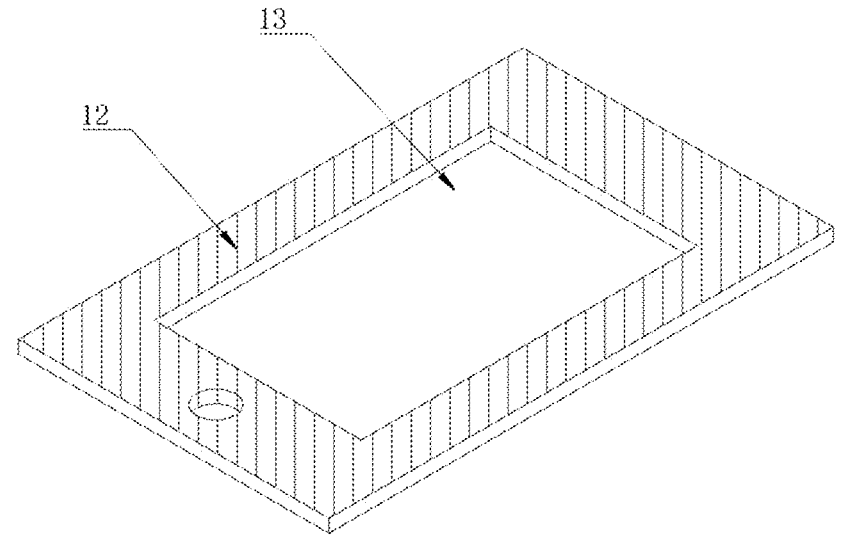
FIG. 3 is a structural diagram of an insulating plate of the core according to an embodiment of the present disclosure.
Figure 4:
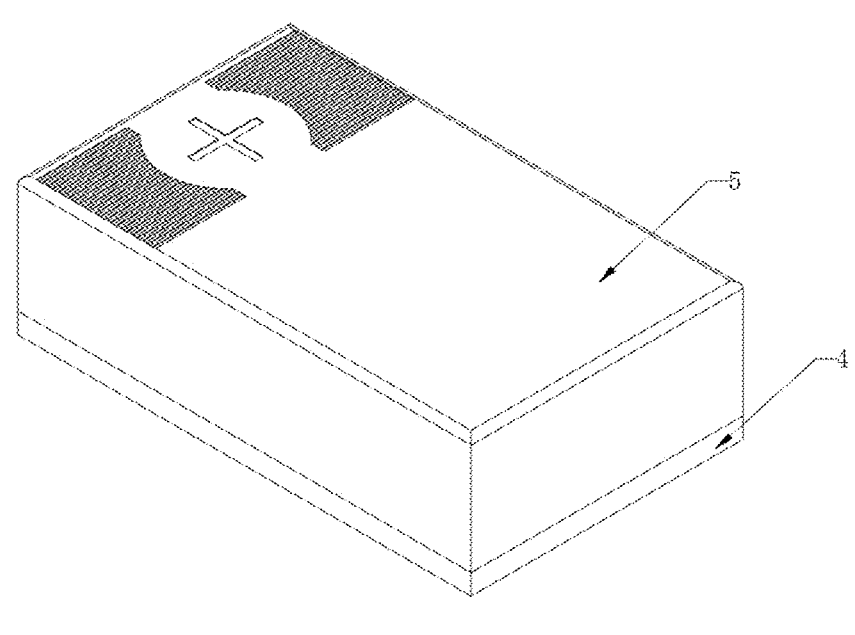
FIG. 4 is a structural diagram of a solid aluminum electrolytic capacitor according to an embodiment of the present disclosure.
Figure 5:
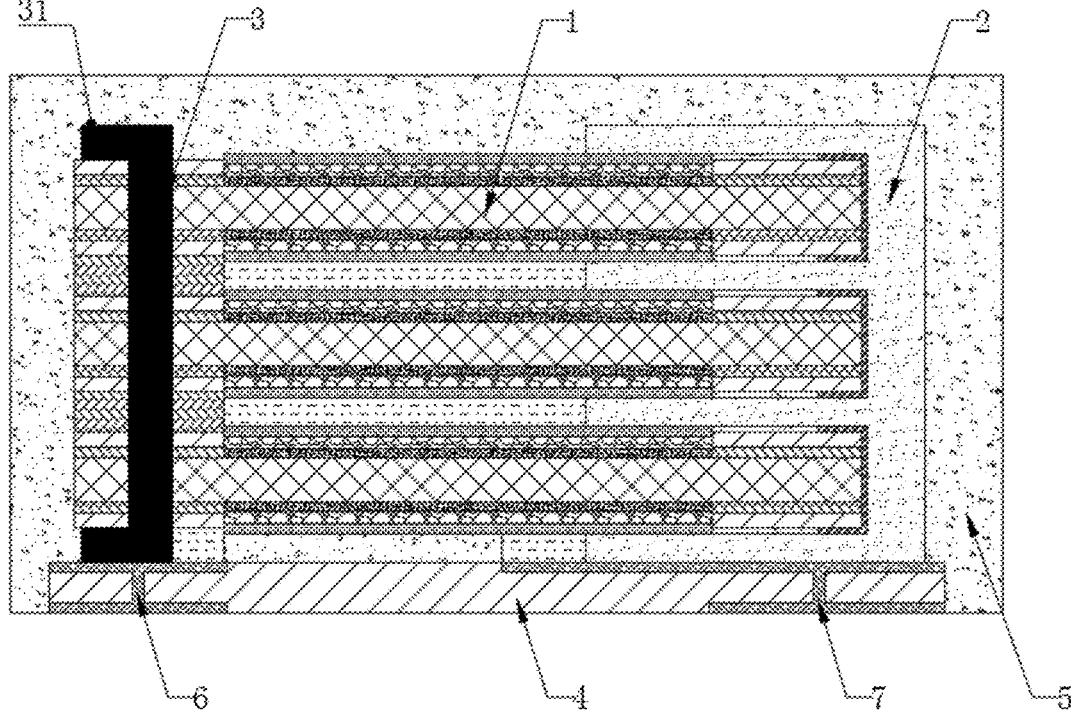
FIG. 5 is a cross-sectional view of the solid aluminum electrolytic capacitor according to an embodiment of the present disclosure.
Figure 6:
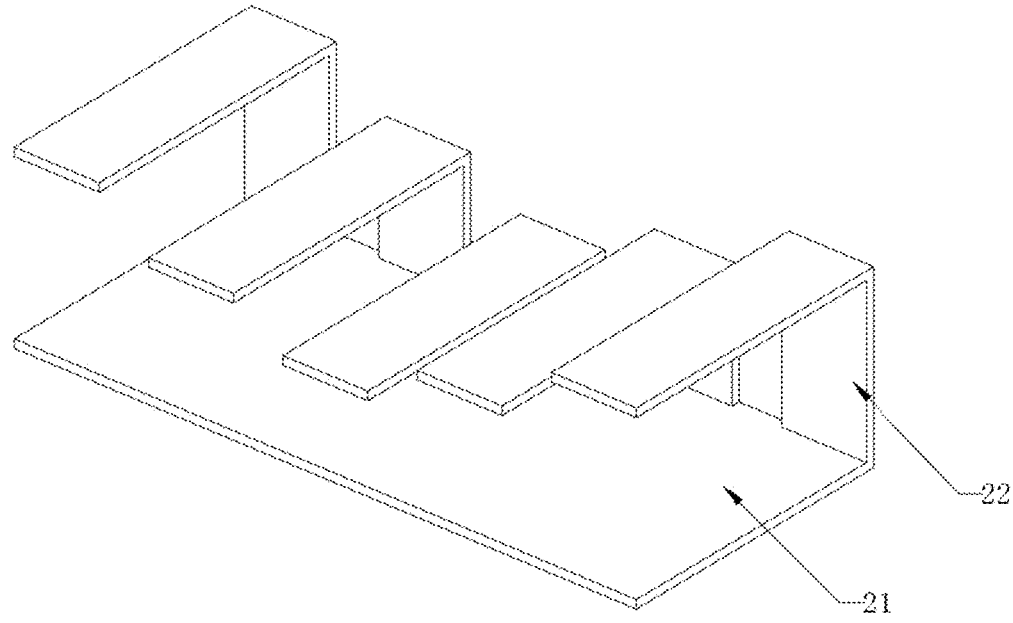
FIG. 6 is a structural diagram of a conductive frame of the solid aluminum electrolytic capacitor according to an embodiment of the present disclosure.
Figure 7:
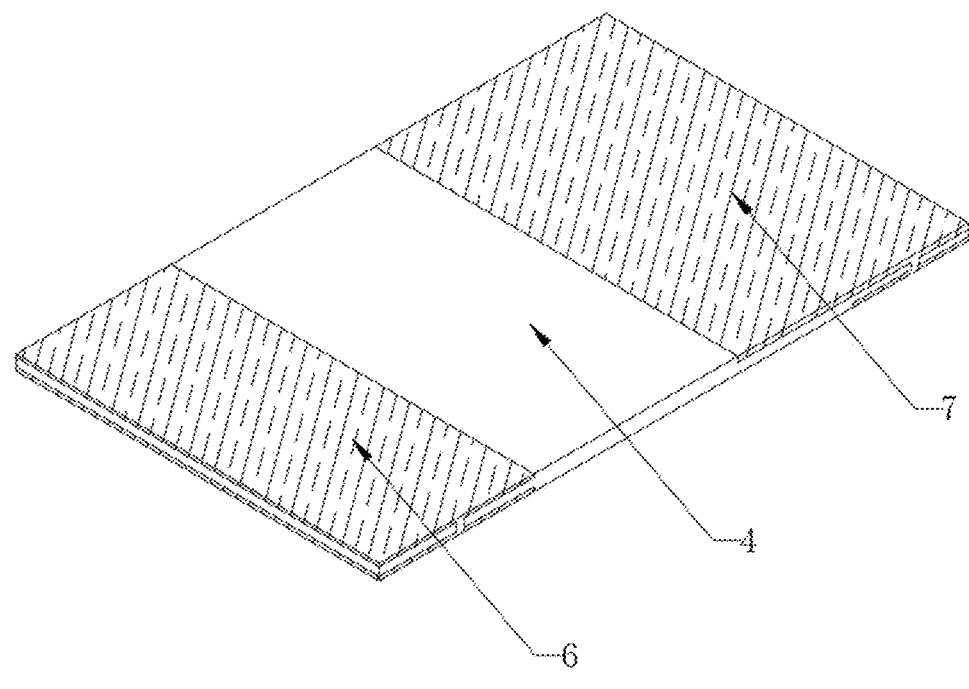
FIG. 7 is a structural diagram of a substrate of the solid aluminum electrolytic capacitor according to an embodiment of the present disclosure.
Figure 8:
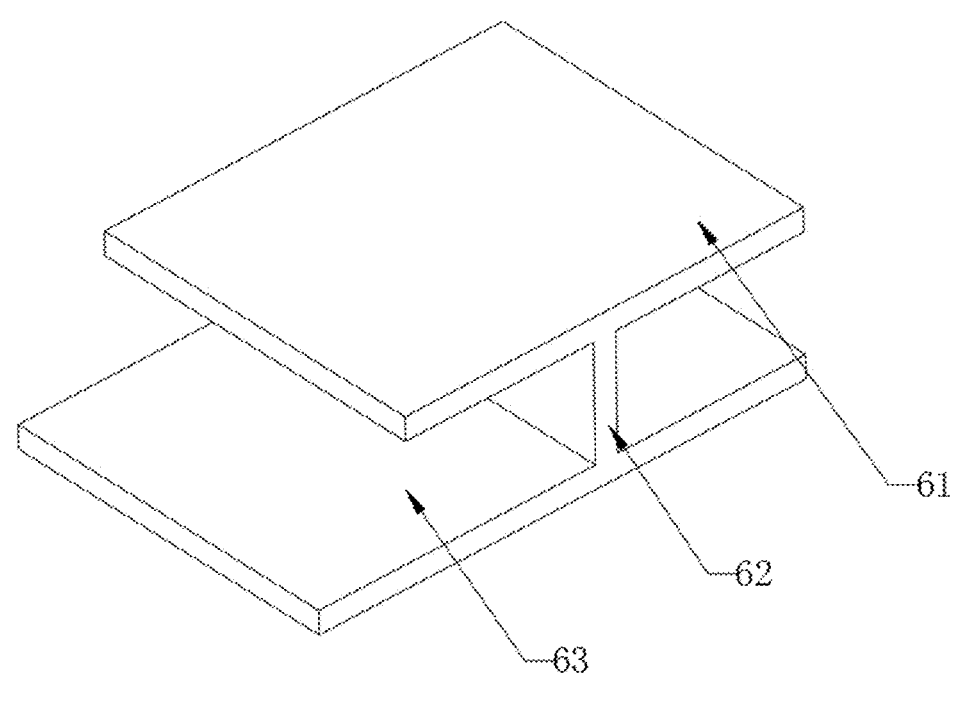
FIG. 8 is a structural diagram of an anode leading-out terminal of the solid aluminum electrolytic according to an embodiment of the present disclosure.

Referring to FIGS. 1-3, a first embodiment provided by the present disclosure is described below.

A core includes an aluminum foil 11, a first insulating plate 12 and a second insulating plate 12, and the aluminum foil 11, the first insulating plate 12 and the second insulating plate 12 are all rectangular. The first insulating plate 12 is insulatedly bonded to a first side of the aluminum foil 11, and the second insulating plate 12 is insulatedly bonded to a second side of the aluminum foil 11, where the first side of the aluminum foil 11 is opposite to the second side of the aluminum foil 11. A middle of each of the first insulating plate 12 and the second insulating plate 12 is provided with a rectangular hollow portion 13. An area of a surface of each of the first side of the aluminum foil 11 and the second side of the aluminum foil 11 corresponding to the hollow portion 13 is provided with a conductive polymer layer 14, a conductive carbon paste layer 15, and a conductive silver paste layer 16 in sequence from inside to outside.

Specifically, a first end of the core 1 is provided with a through hole 17, and a second end of the core 1 is provided with a U-shaped insulating adhesive layer 18, where the first end of the core 1 is opposite to the second end of the core 1. The through hole 17 sequentially runs through the first insulating plate 12, the aluminum foil 11 and the second insulating plate 12. The U-shaped insulating adhesive layer 18 includes a first part, a second part and a third part, where the first part of the U-shaped insulating adhesive layer 18 is provided on a side of the first insulating plate 12 away from the second insulating plate 12; the third part of the U-shaped insulating adhesive layer 18 is provided on a side of the second insulating plate 12 away from the first insulating plate 12; and the second part of the U-shaped insulating adhesive layer 18 is configured to adjoin ends of the aluminum foil 11, the first insulating plate 12 and the second insulating plate 12.

From the above description, it can be seen that the through hole is provided to expose the anode aluminum core, which can be used for an anode lead-out part (e.g., rivet) to pass through to lead out the anode during the preparation of the capacitor. The U-type insulating adhesive layer is provide to solve the short-circuiting problem of positive and negative electrodes caused by the contact of the exposed metal aluminum core on the cut side of the end of the core with the cathode lead-out part (e.g., conductive frame) during the preparation of the capacitor.

Specifically, a length of each of the first insulating plate 12 and the second insulating plate 12 is 100-120% of a length of the aluminum foil 11, and a width of each of the first insulating plate 12 and the second insulating plate 12 is 100-120% of a width of the aluminum foil 11.

From the above description, it can be seen that the cross-section of the insulating plate is equal to or slightly larger than that of the aluminum foil, which can enable the aluminum foil to be completely adhered to the insulating plate while avoiding that insulating plate is too large to affect the volume of the capacitor.

Specifically, the length of the hollow portion 13 is 50-80% of that of each of the first insulating plate 12 and the second insulating plate 12, and the width of the hollow portion 13 is 70-90% of that of each of the first insulating plate 12 and the second insulating plate 12.

From the above description, it can be seen that the hollow portion with the above-mentioned size can enable the capacitance of the core to meet the product design requirements while ensuring a sufficient adhesive force between the insulating plate and the aluminum foil.

Embodiment 2

Referring to FIGS. 4-8, a second embodiment provided by the present disclosure is described below.

A high-voltage-resistant multilayer solid aluminum electrolytic capacitor includes N cores 1, a conductive frame 2, a rivet 3, a substrate 4 and a resin casing 5.

The N cores 1 are sequentially stacked from bottom to top. Adjacent conductive silver paste layers 16 of adjacent two cores 1 among the N cores 1 are electrically connected. Insulating plates of the adjacent two cores 1 that are close to each other are insulatedly connected. Ends of the N cores 1 provided with the U-shaped insulating adhesive layer 18 are connected through the conductive frame 2, and the conductive frame 2 is in contact with and electrically connected to the conductive silver paste layer 16 of each of the N cores 1. The rivet 3 sequentially passes through through holes 17 of the N cores 1. A first end of the rivet 3 extends out of an uppermost one among the N cores 1, and a second end of the rivet 3 extends out of a lowermost one among the N cores 1. The substrate 4 is rectangular, and the opposite two ends of the substrate 4 are provided with an anode leading-out terminal 6 and a cathode leading-out terminal 7, respectively. The N cores 1 are provided on an upper surface of the substrate 4, and the second end of the rivet 3 is in contact with and electrically connected to the anode leading-out terminal 6. The conductive frame 2 is in contact with and electrically connected to the cathode leading-out terminal 7. The resin casing 5 covers the upper surface and four side surfaces of the substrate 4, the N cores 1, the conductive frame 2, and the rivet 3. The lower surfaces of the substrate 4, the anode leading-out terminal 6 and the cathode leading-out terminal 7 are all exposed outside the resin casing 5.

From the above description, it can be seen that when preparing the above capacitor, the anode of the core is led out by the rivet instead of direct welding, and the cathodes of the cores are connected and fixed by a multi-branched conductive frame in addition to the conductive silver paste bonding. Furthermore, the peripheries of the adjacent cores are adhered to each other, forming a solid core package. In this way, the prepared capacitor can solve the problems of missing layer and delamination caused by poor soldering performance of the thicker aluminum foil oxide film layer, and thus can improve the yield of industrialized production.

Specifically, the first end of the rivet 3 is configured to be bent in a direction away from the conductive frame 2 to form a first bent portion 31, and the second end of the rivet 3 is configured to be bent in a direction away from the conductive frame 2 to form a second bent portion 31. The second bent portion 31 is in contact with the substrate 4.

It can be seen from the above description that bending the rivet can not only play a role in fixing the core, but also increase the contact area between the rivet and the anode leading-out terminal.

Specifically, the conductive frame 2 includes a horizontally disposed first conductive portion 21 and 2N−1 vertically arranged L-shaped second conductive portions 22, and the L-shaped second conductive portions 22 are arranged at equal intervals.

Among the 2N−1 L-shaped second conductive portions 22, the one located at the midmost is denoted as a No. 1 second conductive portion. The remaining second conductive portions 22 are symmetrically arranged with respect to the No. 1 second conductive portion. N−1 second conductive portions among the 2N−1 second conductive portions at a first side of the No. 1 second conductive portion are sequentially denoted as a No. 2 second conductive portion, a No. 4 second conductive portion, a No. 6 second conductive portion, a No. 8 second conductive portion, . . . , and a No. (2N−2) second conductive portion along a direction away from the No. 1 second conductive portion. N−1 second conductive portions among the 2N−1 second conductive portions at a second side of the No. 1 second conductive portion are sequentially denoted as a No. 3 second conductive portion, a No. 5 second conductive portion, a No. 7 second conductive portion, a No. 9 second conductive portion, . . . , and a No. (2N−1) second conductive portion along a direction away from the No. 1 second conductive portion.

The first conductive portion 21 is provided on the conductive silver paste layer 16 on the lower surface of the lowermost one among the N cores 1. A horizontal portion of the No. 1 second conductive portion is provided on the conductive silver paste layer 16 on an upper surface of the lowermost one among the N cores. Horizontal portions of the No. 2 second conductive portion and the No. 3 second conductive portion are provided on the conductive silver paste layer 16 on an upper surface of a second lowermost one among the N cores. Horizontal portions of a the No. 4 second conductive portion and the No. 5 second conductive portion are provided on the conductive silver paste layer 16 on an upper surface of a third lowermost one among the N cores, . . . , and horizontal portions of the No. (2N−2) second conductive portion and the No. (2N−1) second conductive portion are provided on the conductive silver paste layer 16 on an upper surface of a N$^{th}$ lowermost one among the N cores.

From the above description, it can be seen that the core above the lowermost one among the N cores is symmetrically provided with a second conductive portion for leading out, which can ensure the flatness and compactness of the core package, and can increase the lead-out area and reduce the equivalent series resistance (ESR).

Specifically, the anode leading-out terminal 6 includes an anode horizontal portion 61, an anode connection portion 62, and an anode terminal 63. The anode horizontal portion 61 and the anode terminal 63 are provided on opposite two sides of the substrate 4, respectively. The anode horizontal portion 61 is in contact with and electrically connected with the rivet 3. The anode connection portion 62 is threaded into the substrate 4, and is perpendicularly and electrically connected with the anode horizontal portion 61 and the anode terminal 63.

The cathode leading-out terminal 7 is identical to the anode leading-out terminal 6 in structure and shape.

Embodiment 3

Figure 9:
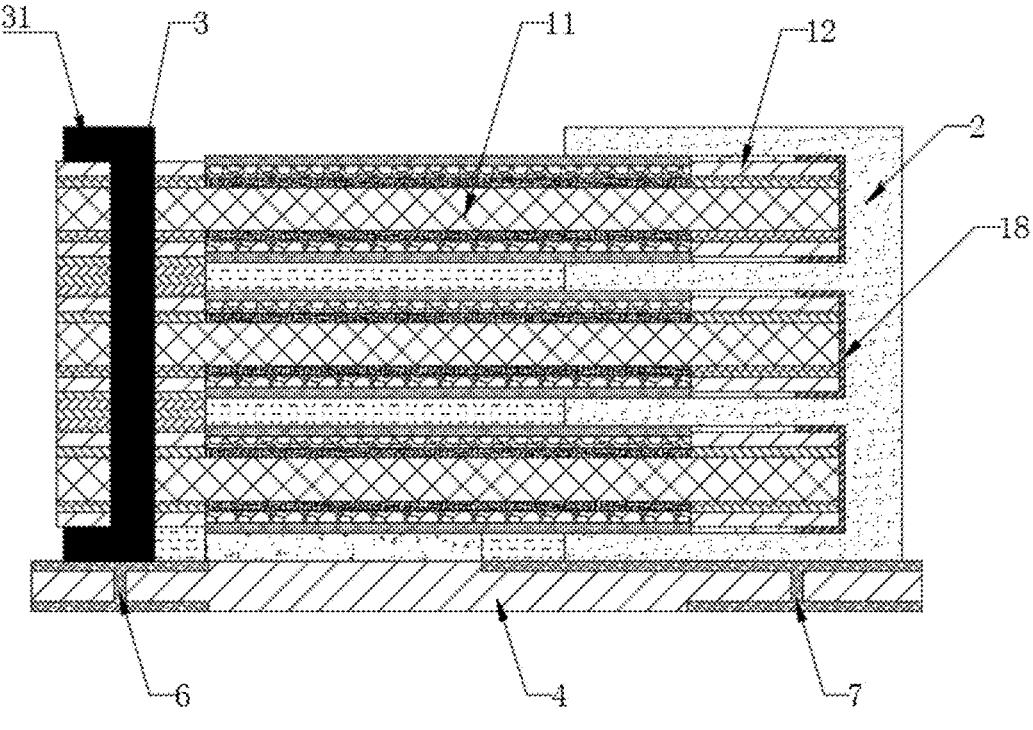
FIG. 9 is a cross-sectional view of a third core package in a method for preparing the solid aluminum electrolytic capacitor according to an embodiment of the present disclosure.
Figure 10:
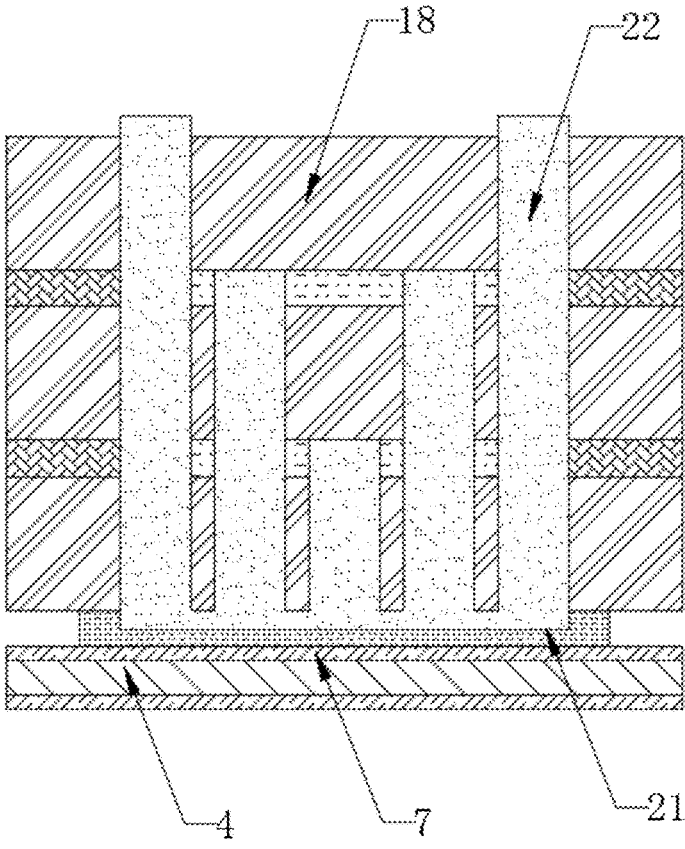
FIG. 10 is a side view of FIG. 9.

Referring to FIGS. 9-11, a third embodiment provided by the present disclosure is described below.

A method for preparing the high-voltage-resistant multilayer solid aluminum electrolytic capacitor, which includes the following steps.

(S1) Each of a first rectangular insulating plate 12 and a second rectangular insulating plate 12 is processed by punching to form a rectangular hollow portion 13 with a design size thereon.

(S2) A first insulating adhesive is coated on one side of each of the first rectangular insulating plate 12 and the second rectangular insulating plate 12 obtained in step (S1). The first rectangular insulating plate 12 coated with the first insulating adhesive is bonded to an upper side of a rectangular aluminum foil 11, and the second rectangular insulating plate 12 coated with the first insulating adhesive is bonded to a lower side of a rectangular aluminum foil 11 to obtain a first composite.

(S3) A conductive polymer layer 14, a conductive carbon paste layer 15, and a conductive silver paste layer 16 are successively, from inside to outside, formed on the hollow portion 13 on each of two sides of the first composite to obtain a second composite.

(S4) A second insulating adhesive is coated on a side surface, an upper surface and a lower surface of an end of the second composite to form a U-shaped insulating adhesive layer 18, so as to obtain a core 1.

(S5) N cores 1 are sequentially stacked from bottom to top, and connected and fixed with a conductive frame 2 layer by layer to obtain a first core package, where the end of each of the N cores 1 provided with the U-shaped insulating adhesive layer 18 faces towards the conductive frame 2.

(S6) An end of the first core package that is not connected to the conductive frame 2 is punched to form a through hole 17. A strip rivet 3 is inserted into the through hole 17, and two ends of the rivet 3 exposed outside the through hole 17 are bent in a direction far away from the conductive frame 2 to abut a surface of the first core package to form a pair of bent portions 31, such that a second core package is obtained.

(S7) The lower one of the pair of bent portions 31 is bonded to an anode horizontal portion 61 of a substrate 4 through a conductive silver adhesive. The conductive silver paste layer 16 on a lower surface of a lowermost one among the N cores, the first conductive portion 21 of the conductive frame 2, and a cathode horizontal portion of the substrate 4 are bonded through the conductive silver adhesive to form a third core package.

(S8) The third core package is encapsulated with an epoxy resin moulding material, such that an upper surface and four side surfaces of the substrate 4, the N cores 1, the conductive frame 2 and the strip rivet 3 are wrapped by a resin casing 5, and a lower surface of the substrate 4, a lower surface of an anode terminal 63 and a lower surface of a cathode terminal are exposed outside the resin casing 5 to obtain the multilayer solid aluminum electrolytic capacitor.

Specifically, step (S5) includes the following steps.

(S51) A surface of the first conductive portion 21 of the conductive frame 2 toward a plurality of second conductive portions 22 is coated with a conductive silver adhesive. The conductive silver paste layer 16 on a lower surface of a first core 1 among the N cores is bonded to the first conductive portion 21. A midmost one among the plurality of second conductive portions 22 is attached to an end side of the first core 1, and the midmost one among the plurality of second conductive portions 22 is bent toward an upper surface of the first core 1 at an angle of 90° to form a first horizontal portion to be in contact with the conductive silver paste layer 16 on the upper surface of the first core 1 to complete stacking of the first core 1.

(S52) A third insulating adhesive is coated on a surface of the first insulating plate 12 of the first core 1. The conductive silver adhesive is coated on the surface of the conductive silver paste layer 16 on the upper surface of the first core 1 and the surface of the horizontal portion of the midmost one among the plurality of second conductive portions. A second insulating plate 12 of a second core 1 among the N cores is bonded to the first insulating plate 12 of the first core 1. The conductive silver paste layer 16 on the lower surface of the second core 1 is bonded with the conductive silver paste layer 16 on the upper surface of the first core 1, and the horizontal portion of the midmost one among the plurality of second conductive portions. Two second conductive portions among the plurality of second conductive portions 22 adjacent to the midmost one are attached to an end side of the second core 1, and the two second conductive portions adjacent to the midmost one among the plurality of second conductive portions are bent toward an upper surface of the second core 1 at an angle of 90° to form a second horizontal portion to be in contact with the conductive silver paste layer 16 on the upper surface of the second core 1 to complete stacking of the second core 1.

(S53) Step (S52) is repeated to sequentially complete the stacking of the third to the N$^{th}$ cores 1 to obtain the first core package.

Referring to FIGS. 1-3, the Embodiment 1 of the present disclosure provides a core 1, which includes an aluminum foil 11, a first insulating plate 12 and a second insulating plate 12, and the aluminum foil 11, the first insulating plate 12 and the second insulating plate 12 are all rectangular. The first insulating plate 12 is insulatedly bonded to a first side of the aluminum foil 11, the second insulating plate 12 is insulatedly bonded to a second side of the aluminum foil 11, where the first side of the aluminum foil 11 is opposite to the second side of the aluminum foil 11. A middle of each of the first insulating plate 12 and the second insulating plate 12 is provided with a rectangular hollow portion 13. An area of a surface of each of the first side and the second side of the aluminum foil 11 corresponding to the hollow portion 13 is provided with a conductive polymer layer 14, a conductive carbon paste layer 15, and a conductive silver paste layer 16 in sequence from inside to outside. A first end of the core 1 is provided with a through hole 17, and a second end of the core 1 is provided with a U-shaped insulating adhesive layer 18, where the first end of the core 1 is opposite to the second end of the core 1. The through hole 17 sequentially runs through the first insulating plate 12, the aluminum foil 11 and the second insulating plate 12. The U-shaped insulating adhesive layer 18 includes a first part, a second part and a third part, where the first part of the U-shaped insulating adhesive layer 18 is provided on a side of the first insulating plate 12 away from the second insulating plate 12; the third part of the U-shaped insulating adhesive layer 18 is provided on a side of the second insulating plate 12 away from the first insulating plate 12; and the second part of the U-shaped insulating adhesive layer 18 is configured to adjoin ends of the aluminum foil 11, the first insulating plate 12 and the second insulating plate 12.

In this embodiment, a length of each of the first insulating plate 12 and the second insulating plate 12 is equal to a length of the aluminum foil 11, and a width of each of the first insulating plate 12 and the second insulating plate 12 is equal to a width of the aluminum foil 11. Each of the first insulating plate 12 and the second insulating plate 12 is made of a polymer insulating material, preferably a polyimide film.

In this embodiment, the length of the hollow portion 13 is 65% of that of each of the first insulating plate 12 and the second insulating plate 12, and the width of the hollow portion 13 is 80% of that of each of the first insulating plate 12 and the second insulating plate 12.

In this embodiment, the insulating plate 12 is bonded to the aluminum foil 11 through an insulating adhesive.

Referring to FIGS. 1-8, the Embodiment 2 of the present disclosure provides a high-voltage-resistant multilayer solid aluminum electrolytic capacitor, which includes three cores 1 of the Embodiment 1, a conductive frame 2, a rivet 3, a substrate 4 and a resin casing 5.

The three cores 1 are sequentially stacked from bottom to top, with through holes 17 being aligned with each other. Adjacent conductive silver paste layers 16 of adjacent two cores 1 are bonded through a conductive silver adhesive and are electrically connected. Insulating plates 12 of adjacent two cores 1 that are close to each other are insulatedly bonded through an insulating adhesive. Ends of the three cores 1 provided with a U-shaped insulating adhesive layer 18 are connected to each other through the conductive frame 2, and the conductive frame 2 is in contact with and electrically connected to the conductive silver paste layer 16 of each core 1.

The rivet 3 sequentially passes through through holes 17 of the three cores 1. A first end of the rivet 3 extends out of an uppermost one among the three cores 1, and a second end of the rivet 3 extends out of a lowermost one among the three cores 1, and the first end of the rivet 3 and the second end of the rivet 3 are bent in a direction away from the conductive frame 2 to form a pair of bent portions 31.

The substrate 4 is rectangular, and the opposite two ends of the substrate 4 are provided with an anode leading-out terminal 6 and a cathode leading-out terminal 7, respectively. The three cores 1 are provided on an upper surface of the substrate 4, and the lower one of the pair of bent portions 31 is in contact with and electrically connected to the anode leading-out terminal 6. The conductive frame 2 is in contact with and electrically connected to the cathode leading-out terminal 7.

The resin casing 5 covers the upper surface and four side surfaces of the substrate 4, the three cores 1, the conductive frame 2 and the rivet 3. The lower surfaces of the substrate 4, the anode leading-out terminal 6 and the cathode leading-out terminal 7 are all exposed outside the resin casing 5.

In this embodiment, the conductive frame 2 includes a horizontally disposed first conductive portion 21 and five vertically arranged L-shaped second conductive portions 22, and the five L-shaped second conductive portions 22 are arranged at equal intervals. Among the five L-shaped second conductive portions 22, the one located at the midmost is denoted as a No. 1 L-shaped second conductive portion. The remaining L-type second conductive portions 22 are symmetrically arranged with respect to the No. 1 L-type second conductive portion. The two L-type second conductive portions at a first side of the No. 1 L-type second conductive portion are denoted as a No. 2 L-shaped second conductive portion and a No. 4 L-shaped second conductive portion, respectively along a direction away from the first L-type second conductive portion. The two L-type second conductive portions at a second side of the No. 1 L-type second conductive portion are denoted as a No. 3 L-shaped second conductive portion and a No. 5 L-shaped second conductive portion, respectively along a direction away from the first L-type second conductive portion.

In this embodiment, the three cores are denoted as a first core, a second core and a third core, respectively, from bottom to up. During production of the capacitor, the first conductive portion 21 is in contact with and electrically conductive with the conductive silver paste layer 16 on a lower surface of the first core 1. A horizontal portion of the No. 1 L-type second conductive portion is provided on and electrically conductive with the conductive silver paste layer 16 on the upper surface of the first core 1. Horizontal portions of the No. 2 L-type second conductive portion and the No. 3 L-type second conductive portion are provided on and electrically conductive with the conductive silver paste layer 16 on the upper surface of the second core 1. Horizontal portions of the No. 4 L-type second conductive portion and the No. 5 L-type second conductive portion are provided on and electrically conductive with the conductive silver paste layer 16 on the upper surface of the third core 1.

Furthermore, the width of the first conductive portion 21 is less than or equal to the width of the hollow portion 13. The distance between the outer edges of the outermost symmetrical two second conductive portions 22 is equal to the width of the first conductive portion 21.

In this embodiment, the substrate 4 is made of an insulating material, preferably an epoxy woven glass fabric laminated sheet.

In this embodiment, the conductive frame 2, the rivet 3, the anode leading-out terminal 6 and the cathode leading-out terminal 7 are all made of copper and copper alloy.

In this embodiment, the anode leading-out terminal 6 includes an anode horizontal portion 61, an anode connection portion 62, and an anode terminal 63. The anode horizontal portion 61 and the anode terminal 63 are provided on opposite two sides of the substrate 4, respectively. The anode horizontal portion 61 is in contact with and electrically connected with the rivet 3. The anode connection portion 62 is threaded into the substrate 4, and is perpendicularly and electrically connected with the anode horizontal portion 61 and the anode terminal 63.

The cathode leading-out terminal 7 is identical to the anode leading-out terminal 6 in structure and shape.

Moreover, to avoid short-circuiting of the cathode and anode due to spreading of solder paste when soldering the capacitor on a client board, the distance between the mutually proximate edges of the anode terminal 63 and the cathode terminal is 50-70% (preferably 60%) of the length of the substrate 4, and a tin layer is provided on the surface of the anode terminal 63 and the cathode terminal away from the substrate 4.

Referring to FIGS. 1-11, the Embodiment 3 of the present disclosure provides a method for preparing the high-voltage-resistant multilayer solid aluminum electrolytic capacitor, which includes the following steps.

(S1) Each of a first rectangular insulating plate 12 (polymer insulating film) and a second rectangular insulating plate 12 (polymer insulating film) is punched to form a rectangular hollow portion 13 with a design size thereon.

(S2) A first insulating adhesive is coated on one side of each of the first rectangular insulating plate 12 and the second rectangular insulating plate 12 obtained in step (S1). The first rectangular insulating plate 12 coated with the first insulating adhesive is bonded to an upper side of a rectangular aluminum foil 11, and the second rectangular insulating plate 12 coated with the first insulating adhesive is bonded to a lower side of a rectangular aluminum foil 11 to obtain a first composite.

(S3) A conductive polymer layer 14, a conductive carbon paste layer 15, and a conductive silver paste layer 16 are successively, from inside to outside, formed on the hollow portion 13 on each of two sides of the first composite to obtain a second composite.

(S4) A second insulating adhesive is coated on a side surface, an upper surface and a lower surface of an end of the second composite to form a U-shaped insulating adhesive layer 18, so as to obtain a core 1.

(S5) Three cores 1 are sequentially stacked from bottom to top, and connected and fixed with an external conductive frame 2 layer by layer to obtain a first core package, where the end of each of the three cores 1 provided with the U-shaped insulating adhesive layer 18 faces towards the external conductive frame 2.

(S6) An end of the first core package that is not connected to the conductive frame 2 is punched to form a through hole 17. A strip rivet 3 is inserted into the through hole 17, and two ends of the rivet 3 exposed outside the through hole 17 are bent in a direction far away from the conductive frame 2 to abut a surface of the first core package to form a pair of bent portions 31, such that a second core package is obtained.

(S7) The lower one of the pair of bent portions 31 is bonded to an anode horizontal portion 61 of a substrate 4 through a conductive silver adhesive. The conductive silver paste layer 16 on a lower surface of a lowermost one among the three cores 1, the first conductive portion 21 of the conductive frame 2, and a cathode horizontal portion of the substrate 4 are bonded through the conductive silver adhesive to form a third core package.

(S8) The third core package is encapsulated with an epoxy resin moulding material, such that an upper surface and four side surfaces of the substrate 4, the three cores 1, the conductive frame 2 and the strip rivet 3 are wrapped by a resin casing 5, and a lower surface of the substrate 4, a lower surface of an anode terminal 63 and a lower surface of a cathode terminal are exposed outside the resin casing 5 to obtain the multilayer solid aluminum electrolytic capacitor.

In this embodiment, the three cores 1 are stacked and connected to the external conductive frame 2 through the following steps.

(S51) A surface of the first conductive portion 21 of the conductive frame 2 toward a plurality of second conductive portions 22 is coated with a conductive silver adhesive. The conductive silver paste layer 16 on a lower surface of a first core 1 among the three cores is bonded to the first conductive portion 21. A midmost one among the plurality of second conductive portions 22 is attached to an end side of the first core 1, and the midmost one among the plurality of second conductive portions 22 is bent toward an upper surface of the first core 1 at an angle of 90° to form a first horizontal portion to be in contact with the conductive silver paste layer 16 on the upper surface of the first core 1 to complete stacking of the first core 1.

(S52) A third insulating adhesive is coated on a surface of the first insulating plate 12 of the first core 1. The conductive silver adhesive is coated on the surface of the conductive silver paste layer 16 on the upper surface of the first core 1 and the surface of the horizontal portion of the No. 1 second conductive portion. A second insulating plate 12 of a second core 1 among the three cores is bonded to the first insulating plate 12 of the first core 1. The conductive silver paste layer 16 on the lower surface of the second core 1 is bonded with the conductive silver paste layer 16 on the upper surface of the first core 1, and the horizontal portion of the No. 1 second conductive portion. A No. 2 second conductive portion 22 and a No. 3 second conductive portion 22, which are adjacent to the No. 1 second conductive portion 22, are attached to an end side of the second core 1, and the No. 2 second conductive portion 22 and the No. 3 second conductive portion 22 are bent toward an upper surface of the second core 1 at an angle of 90° to form a second horizontal portion to be in contact with the conductive silver paste layer 16 on the upper surface of the second core 1 to complete stacking of the second core 1.

(S53) Step (S52) is repeated to sequentially complete the stacking of the third core 1 to obtain the first core package.

Figure 12:
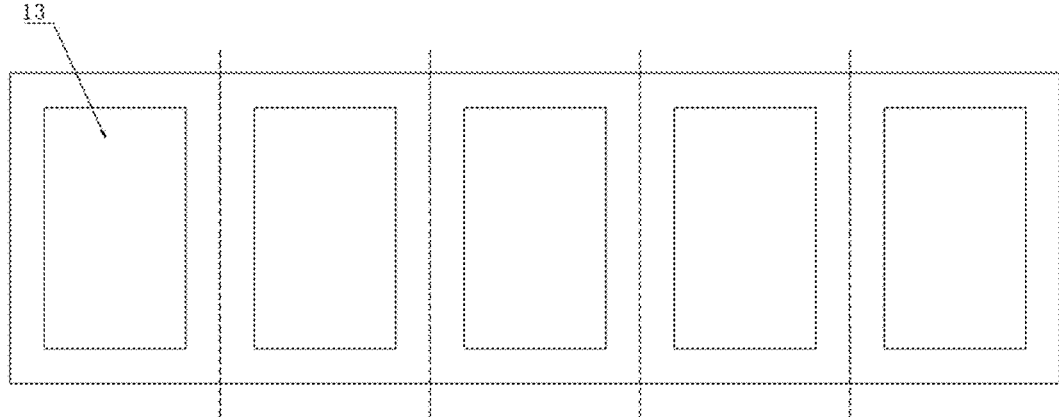
FIG. 12 is a schematic diagram of a first structure of an insulating plate of a capacitor in mass production according to an embodiment of the present disclosure.
Figure 13:
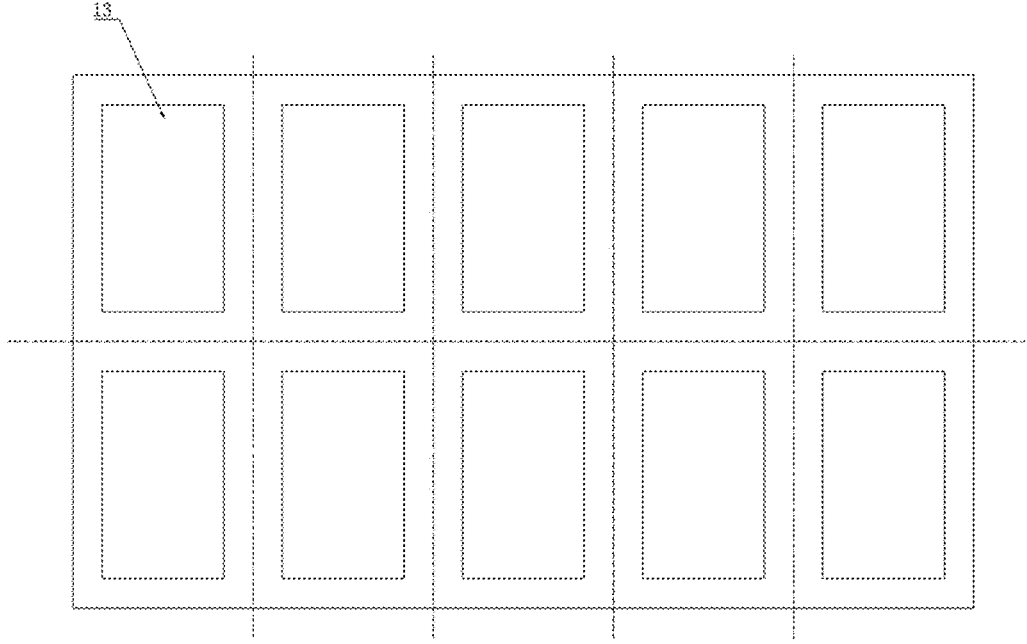
FIG. 13 is a schematic diagram of a second structure of an insulating plate of a capacitor in mass production according to an embodiment of the present disclosure.

In this embodiment, when the capacitor is produced in batch, a band-shaped polymer insulating film can be used, and multiple rectangular hollow portions are arranged in the shape of a band. As shown in FIG. 12, after rectangular core units are formed by cutting the insulating film according to edges of the rectangular hollow portions, at least one of length and width of the polymer insulating film of each core unit is equal to that of the aluminum foil that is located between the two polymer insulating films. Alternatively, as shown in FIG. 13, a rectangle or square polymer insulating film is used. Multiple rectangular hollow portions are arranged in an array. After rectangular core units are formed by cutting the insulating film according to edges of the rectangular hollow portions, the length and the width of the polymer insulating film of each core unit are respectively equal to that of the aluminum foil that is located between the two polymer insulating films.

Therefore, steps S1-S2 can also be set as follows.

(S1) Each of a first band-shaped polymer insulating plate 12 and a second band-shaped polymer insulating plate 12 is processed by punching to form N rectangular hollow portions 13 with a design size thereon arranged at equal intervals.

(S2) A first insulating adhesive is coated on one side of each of the first band-shaped polymer insulating plate 12 and the second band-shaped polymer insulating plate 12 obtained in step (S1). The first band-shaped polymer insulating plate 12 coated with the first insulating adhesive is bonded to an upper side of a band-shaped aluminum foil 11, and the second band-shaped polymer insulating plate 12 coated with the first insulating adhesive is bonded to a lower side of a band-shaped aluminum foil 11, followed by cutting between adjacent two of N rectangular hollow portions, such that N first composites are obtained.

Alternatively, steps S1-S2 can also be set as follows.

(S1) Each of a first square polymer insulating plate 12 and a second square polymer insulating plate 12 is processed by punching to form N rectangular hollow portions 13 with a design size thereon arranged in array.

(S2) A first insulating adhesive is coated on one side of each of the first square polymer insulating plate 12 and the second square polymer insulating plate 12 obtained in step (S1). The first square polymer insulating plate 12 coated with the first insulating adhesive is bonded to an upper side of a square aluminum foil 11, and the second square polymer insulating plate 12 coated with the first insulating adhesive is bonded to a lower side of a square aluminum foil 11, followed by cutting between adjacent two of N rectangular hollow portions, such that N first composites are obtained.

Although the present disclosure has been described in detail above, those skilled in the art can still make various modifications, replacements and variations to the technical solutions recited in the embodiments provided herein. It should be understood that those modifications, replacements and variations made without departing from the principle and spirit of the present disclosure shall fall within the scope of the present disclosure defined by the appended claims.

What is claimed is:

1. A core, comprising:
   an aluminum foil;
   a first insulating plate; and
   a second insulating plate;
   wherein the aluminum foil, the first insulating plate and the second insulating plate are all rectangular; the first insulating plate is insulatedly bonded to a first side of the aluminum foil, and the second insulating plate is insulatedly bonded to a second side of the aluminum foil, wherein the first side of the aluminum foil is opposite to the second side of the aluminum foil; a middle of each of the first insulating plate and the second insulating plate is provided with a rectangular hollow portion; and an area of a surface of each of the first side of the aluminum foil and the second side of the aluminum foil corresponding to the rectangular hollow portion is provided with a conductive polymer layer, a conductive carbon paste layer and a conductive silver paste layer in sequence from inside to outside.

2. The core of claim 1, wherein a first end of the core is provided with a through hole, and a second end of the core is provided with a U-shaped insulating adhesive layer, wherein the first end of the core is opposite to the second end of the core; the through hole is configured to sequentially run through the first insulating plate, the aluminum foil and the second insulating plate; and the U-shaped insulating adhesive layer comprises a first part, a second part and a third part, wherein the first part of the U-shaped insulating adhesive layer is provided on a side of the first insulating plate away from the second insulating plate; the third part of the U-shaped insulating adhesive layer is provided on a side of the second insulating plate away from the first insulating plate; and the second part of the U-shaped insulating adhesive layer is configured to adjoin ends of the aluminum foil, the first insulating plate and the second insulating plate.

3. The core of claim 1, wherein a length of each of the first insulating plate and the second insulating plate is 100-120% of a length of the aluminum foil; and a width of each of the first insulating plate and the second insulating plate is 100-120% of a width of the aluminum foil.

4. The core of claim 1, wherein a length of the rectangular hollow portion is 50-80% of a length of each of the first insulating plate and the second insulating plate; and a width of the rectangular hollow portion is 70-90% of a width of each of the first insulating plate and the second insulating plate.

5. A multilayer solid aluminum electrolytic capacitor, comprising:
   the core of claim 2;
   a conductive frame;
   a rivet;
   a substrate; and
   a resin casing;

wherein the number of the core is N, and N cores are configured to be sequentially stacked from bottom to top; adjacent conductive silver paste layers of adjacent two cores among the N cores are electrically connected; insulating plates of the adjacent two cores that are close to each other are insulatedly connected; ends of the N cores provided with the U-shaped insulating adhesive layer are connected through the conductive frame, and the conductive frame is in contact with and electrically connected to the conductive silver paste layer of each of the N cores; the rivet is configured to sequentially pass through through holes of the N cores; and a first end of the rivet is configured to extend out of an uppermost one among the N cores, and a second end of the rivet is configured to extend out of a lowermost one among the N cores;

the substrate is rectangular; a first end of the substrate is provided with an anode leading-out terminal, and a second end of the substrate is provided with a cathode leading-out terminal, wherein the first end of the substrate is opposite to the second end of the substrate; the N cores are provided on an upper surface of the substrate; the second end of the rivet is in contact with and electrically connected to the anode leading-out terminal; and the conductive frame is in contact with and electrically connected to the cathode leading-out terminal; and the resin casing is configured to cover the upper surface and four side surfaces of the substrate, the N cores, the conductive frame, and the rivet; and lower surfaces of the substrate, the anode leading-out terminal and the cathode leading-out terminal are exposed outside the resin casing.

6. The multilayer solid aluminum electrolytic capacitor of claim 5, wherein the first end of the rivet is configured to be bent in a direction away from the conductive frame to form a first bent portion, and the second end of the rivet is configured to be bent in a direction away from the conductive frame to form a second bent portion; and the second bent portion is in contact with the substrate.

7. The multilayer solid aluminum electrolytic capacitor of claim 5, wherein the conductive frame comprises a first conductive portion and 2N−1 second conductive portions; the first conductive portion is horizontally arranged; the 2N−1 second conductive portions each have an L-shaped structure, and are vertically arranged; and the 2N−1 second conductive portions are arranged at equal intervals;

a midmost one among the 2N−1 second conductive portions is denoted as a No. 1 second conductive portion; remaining second conductive portions among the 2N−1 second conductive portions are symmetrically arranged with respect to the No. 1 second conductive portion; and N−1 second conductive portions among the 2N−1 second conductive portions at a first side of the No. 1 second conductive portion are sequentially denoted as a No. 2 second conductive portion, a No. 4 second conductive portion, a No. 6 second conductive portion, a No. 8 second conductive portion, . . . , and a No. (2N−2) second conductive portion along a direction away from the No. 1 second conductive portion; and N−1 second conductive portions among the 2N−1 second conductive portions at a second side of the No. 1 second conductive portion are sequentially denoted as a No. 3 second conductive portion, a No. 5 second conductive portion, a No. 7 second conductive portion, a No. 9 second conductive portion, . . . , and a No.

(2N−1) second conductive portion along a direction away from the No. 1 second conductive portion; and the first conductive portion is provided on the conductive silver paste layer on a lower surface of the lowermost one among the N cores; a horizontal portion of the No. 1 second conductive portion is provided on the conductive silver paste layer on an upper surface of the lowermost one among the N cores; horizontal portions of the No. 2 second conductive portion and the No. 3 second conductive portion are provided on the conductive silver paste layer on an upper surface of a second lowermost one among the N cores; horizontal portions of a the No. 4 second conductive portion and the No. 5 second conductive portion are provided on the conductive silver paste layer on an upper surface of a third lowermost one among the N cores, . . . , and horizontal portions of the No. (2N−2) second conductive portion and the No. (2N−1) second conductive portion are provided on the conductive silver paste layer on an upper surface of a $N^{th}$ lowermost one among the N cores.

8. The multilayer solid aluminum electrolytic capacitor of claim 5, wherein the anode leading-out terminal comprises an anode horizontal portion, an anode connection portion and an anode terminal; the anode horizontal portion is provided on the upper surface of the substrate, and the anode terminal is provided on a lower surface of the substrate; the anode horizontal portion is in contact with and electrically connected with the rivet; and the anode connection portion is configured to penetrate the substrate, and is perpendicularly and electrically connected with the anode horizontal portion and the anode terminal; and the cathode leading-out terminal is identical to the anode leading-out terminal in structure and shape.

9. A method for preparing a multilayer solid aluminum electrolytic capacitor, comprising:

(S1) processing each of a first rectangular insulating plate and a second rectangular insulating plate by punching to form a rectangular hollow portion with a preset size thereon;

(S2) coating a first insulating adhesive on one side of each of the first rectangular insulating plate and the second rectangular insulating plate obtained in step (S1); and bonding the first rectangular insulating plate coated with the first insulating adhesive to an upper side of a rectangular aluminum foil, and bonding the second rectangular insulating plate coated with the first insulating adhesive to a lower side of the rectangular aluminum foil to obtain a first composite;

(S3) successively forming, from inside to outside, a conductive polymer layer, a conductive carbon paste layer and a conductive silver paste layer on the hollow portion on each of two sides of the first composite to obtain a second composite;

(S4) coating a second insulating adhesive on a side surface, an upper surface and a lower surface of an end of the second composite to form a U-shaped insulating adhesive layer, so as to obtain a core;

(S5) sequentially stacking N cores from bottom to top, wherein each of the N cores is the core obtained in step (S4); and connecting and fixing the N cores with a conductive frame layer by layer to obtain a first core package; wherein an end of each of the N cores provided with the U-shaped insulating adhesive layer faces towards the conductive frame;

(S6) punching an end of the first core package that is not connected to the conductive frame to form a through hole; inserting a strip rivet into the through hole; bending two ends of the strip rivet exposed outside the through hole in a direction away from the conductive frame to abut a surface of the first core package to form a pair of bent portions, such that a second core package is obtained;

(S7) bonding a lower one of the pair of bent portions to an anode horizontal portion of a substrate through a conductive silver adhesive; and bonding the conductive silver paste layer on a lower surface of a lowermost one among the N cores, a first conductive portion of the conductive frame and a cathode horizontal portion of the substrate through the conductive silver adhesive to form a third core package; and (S8) encapsulating the third core package with an epoxy resin moulding material, such that an upper surface and four side surfaces of the substrate, the N cores, the conductive frame and the strip rivet are wrapped by a resin casing, and a lower surface of the substrate, a lower surface of an anode terminal and a lower surface of a cathode terminal are exposed outside the resin casing to obtain the multilayer solid aluminum electrolytic capacitor.

10. The method of claim 9, wherein step (S5) is performed through the following steps:

(S51) coating the conductive silver adhesive on a surface of the first conductive portion of the conductive frame toward a plurality of second conductive portions of the conductive frame; bonding the conductive silver paste layer on a lower surface of a first core among the N cores to the first conductive portion; and attaching a midmost one among the plurality of second conductive portions to an end side of the first core, and bending the midmost one among the plurality of second conductive portions toward an upper surface of the first core at an angle of 90° to form a first horizontal portion to be in contact with the conductive silver paste layer on the upper surface of the first core to complete stacking of the first core;

(S52) coating a third insulating adhesive on a surface of the first rectangular insulating plate of the first core; coating the conductive silver adhesive on a surface of the conductive silver paste layer on the upper surface of the first core and a surface of the horizontal portion of the midmost one among the plurality of second conductive portions; bonding the second insulating plate of a second core among the N cores to the first insulating plate of the first core; bonding the conductive silver paste layer on a lower surface of the second core with the conductive silver paste layer on the upper surface of the first core and the horizontal portion of the midmost one among the plurality of second conductive portions; attaching two second conductive portions among the plurality of second conductive portions adjacent to the midmost one to an end side of the second core, and bending the two second conductive portions adjacent to the midmost one among the plurality of second conductive portions toward an upper surface of the second core at an angle of 90° to form a second horizontal portion to be in contact with the conductive silver paste layer on the upper surface of the second core to complete stacking of the second core; and (S53) repeating step (S52) to sequentially complete stacking of $3^{rd}$-$N^{th}$ cores among the N cores to obtain the first core package.

* * * * *